Jan. 22, 1957 J. P. HILL 2,778,924
APPARATUS AND METHOD FOR PRODUCING FLAT SURFACES
Filed March 22, 1954 2 Sheets-Sheet 1
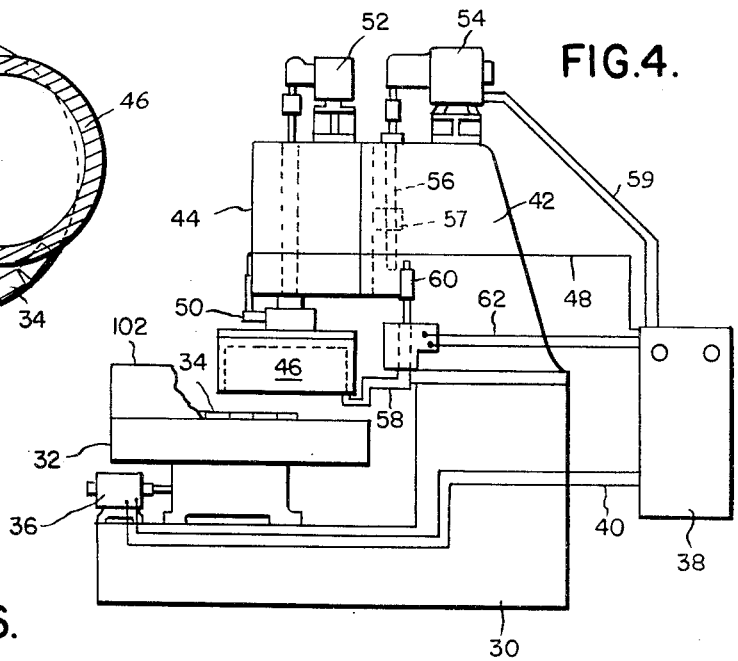
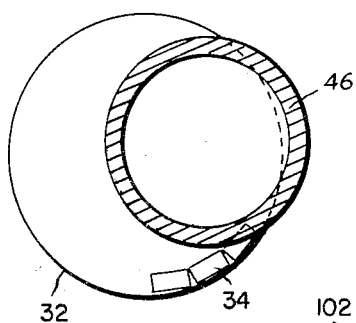
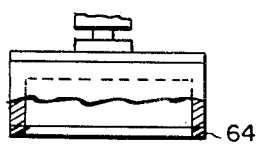
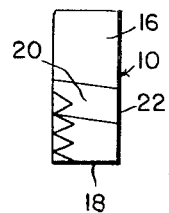
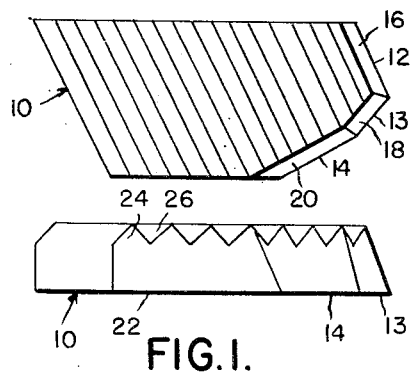
INVENTOR.
JOHN P. HILL
BY Whittemore,
Hulbert & Belknap
ATTORNEYS Jan. 22, 1957 J. P. HILL 2,778,924
APPARATUS AND METHOD FOR PRODUCING FLAT SURFACES
Filed March 22, 1954 2 Sheets-Sheet 2
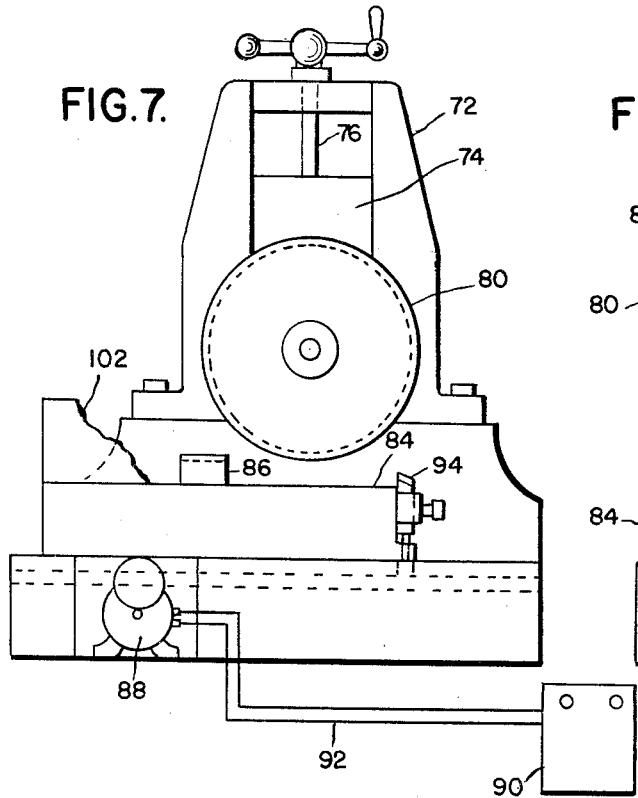
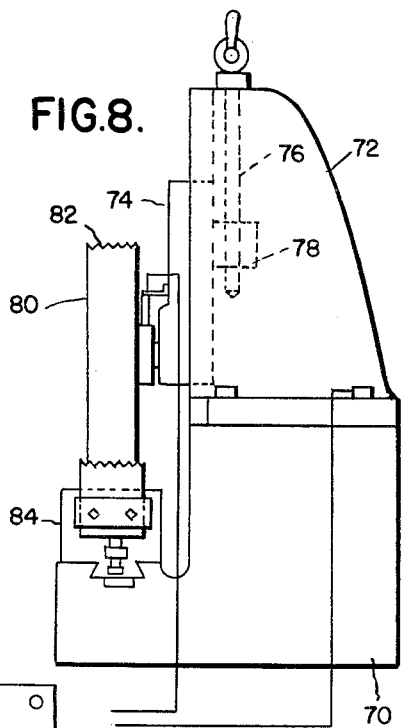
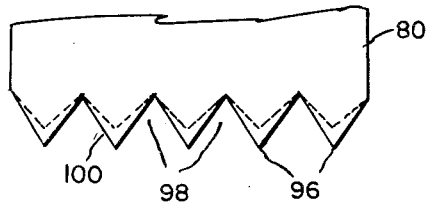
FIG.9.
INVENTOR.
JOHN P. HILL
BY Whittemore,
Hulbert & Belknap
ATTORNEYS United States Patent Office 2,778,924
Patented Jan. 22, 1957

2,778,924

APPARATUS AND METHOD FOR PRODUCING FLAT SURFACES

John P. Hill, Detroit, Mich., assignor to Goddard & Goddard Company, Detroit, Mich., a corporation of Michigan Application March 22, 1954, Serial No. 417,907

13 Claims. (Cl. 219—69)

The present invention relates to cutting elements and method and apparatus for producing the same.

It is an object of the present invention to provide improved cutting elements formed of hard cutting material having cutting edges defined by the intersection of microscopically smooth surfaces such as produced by electric discharge machining.

Electric discharge machining removes metal from a work piece by electronic bombardment and accordingly leaves a machined surface characterized by the complete absence of cracks, fissures, fractures or scratches. A surface machined by electrical discharge machining may have a smoothness of only a few micro-inches but differs very substantially from the surface having the same nominal micro-inch finish produced by prior conventional methods such as grinding. The absence of cracks, fissures and the like produces a surface completely lacking the starting points from which the most fractures occur during use. This surface is defined herein as "microscopical continuous" and is intended to distinguish thereby from a surface exhibiting cracks, fissures, fractures and scratches characteristic of grinding, lapping or the like.

With the foregoing in view, it is a further object of the present invention to provide a cutting blade characterized by a substantially perfect parallelism of opposite sides thereof which permit the blade to be clamped in a holder without the possibility of fracture. Alternatively, the opposite sides may be plane surfaces disposed at a small angle to each other. This is particularly valuable in the case of cutting blades formed of tungsten carbide or the like.

It is a further object of the present invention to provide a cutting blade in the form of a relatively thin body having serrations at one side thereof and having a plane surface at the opposite side disposed in substantially accurate parallelism to the plane defined by the serrations or at a small angle thereto.

It is a further object of the present invention to provide a method of forming serrated surfaces in a cutting element which comprises providing a generally cylindrical electrode having annular circumferential serrations extending therearound, rotating said electrode, providing relative traverse between said electrode and the work piece to cause the electrode to traverse a surface of the work piece from side to side thereof with the serrations on the electrode producing corresponding serrations on the electrode producing corresponding serrations in the surface of the work piece while maintaining a high frequency electrical discharge between the electrode and work piece.

It is a further object of the present invention to practice a method as defined in the preceding paragraph which includes the step of initially forming serrations on the electrode having alternating ribs and grooves, the ribs having sides tapered substantially to a point in cross-section and having an included angle which is more acute than the included angle to be formed at the bottoms of the grooves of the serrations in the work piece, whereby consumption of the material of the ribs of the electrode during relative movement of the electrode to full depth in the work piece modifies the cross-sectional shape of the ribs of the electrode to conform to the required cross-sectional shape of the grooves on the work piece. The exact shape of serrations can of course be varied as required.

It is a further object of the present invention to provide a method of machining a flat surface on a work piece by an electrical discharge which comprises providing a tubular electrode having a flat end surface perpendicular to its axis, rotating the electrode about its axis and providing relative traverse between the electrode and the work piece so as to cause the work piece to move across the end surface of the electrode from a position outside the projected outer surface thereof through a position in which the work piece lies wholly within the projection of the inner surface of the electrode to a position in which the work piece lies wholly outside of the projection of the outer surface of the electrode, while maintaining a high frequency electrical discharge between the electrode and work piece.

It is a further object of the present invention to carry out the method first defined in the preceding paragraph in which the path of relative movement between the electrode and work piece is a curved path intersecting the end surface of the electrode at points less than 180 degrees apart.

It is a further object of the present invention to provide apparatus for machining a serrated surface on a work piece by electrical discharge which comprises means for supporting a generally cylindrical electrode having annular circumferentially extending serrations comprising alternating ribs and grooves, means for rotating the electrode, a work support, means for effecting relative traverse between the electrode and work support in a direction perpendicular to the axis of the electrode with the electrode and work piece positioned so as to cause the serrations of the electrode to form and enter within corresponding serrations in the surface of the work piece while maintaining a high frequency electrical discharge between the electrode and work piece.

It is a further object of the present invention to provide apparatus for electrical discharge machining of a flat surface which comprises a tubular electrode having a flat end surface perpendicular to the axis thereof, means for rotating said electrode on its said axis, a work support means, means for effecting relative movement between said electrode and work support in a direction to cause a work piece on said work support to move across the said end of the electrode in a plane substantially parallel thereto and in a path intersecting the projection of the electrode at two points.

Other objects and features of the invention will become apparent as the description proceeds, especially when taken in conjunction with the drawings, wherein:

Figure 1 is a side view of a cutting blade embodying features of and constructed in accordance with the present invention.

Figure 2 is a plan view of the blade shown in Figure 1.

Figure 3 is an end view of the blade shown in Figure 2.

Figure 4 is a fragmentary elevational view of a machining apparatus for electrical discharge machining of flat surfaces in accordance with the present invention.

Figure 5 is a diagrammatic view illustrating relative movement between the electrode of the machine shown in Figure 4 and the work piece.

Figure 6 is an elevational view partly broken away of a modified form of an electrode.

Figure 7 is a front elevational view of a machine producing serrated surfaces by electrical discharge machining.

Figure 8 is a side elevational view of the machine shown in Figure 7.

Figure 9 is an enlarged diagrammatic view illustrating the necessary modification of the serrations on an electrode of the machine shown in Figures 7 and 8 to produce the required shape of serrations in the work piece.

The present invention relates to a novel cutting element or blade, and method or apparatus for making the same. Basically, the method and apparatus depends upon the use of equipment known as electric discharge machining equipment. In this type of machining means are provided for maintaining with great accuracy an extremely small gap between an electrode and a work piece while maintaining a high frequency electric discharge therebetween. This electric discharge may be at a rate of from 20,000 to millions of cycles per second. The gap between the electrode and the work piece is maintained at a dimension between .0002 inch to .0015 inch. The actual voltage differential between the electrode and work piece may be on the order of 50 volts. Preferably, the gap between the electrode and the work piece is submerged in a coolant.

Equipment for carrying out this operation, comprising means for establishing the required high frequency electrical potential to the electrode and for maintaining the required gap, including feeding means depending upon the rate of consumption of the work piece and electrode, is available. One source of such equipment is Elox, a corporation of Michigan who advertises this equipment as an electronic type machine tool.

The invention in the present case relates to method and apparatus for applying the basic machining operation in particular cases and makes no claim to the details of the apparatus for supplying the high frequency electrical voltage to the electrode or broadly, to control means responsive to a rate of consumption for effecting a required feeding operation. Certain aspects of the basic principles of electric discharge machining are disclosed in patents to Harding Nos. 2,383,382 and 2,441,319, granted August 21, 1945 and May 11, 1948 respectively.

Referring now to the drawings, there is illustrated a cutting blade 10 having cutting edges 12, 13, and 14, and relieved surfaces 16, 18, and 20 behind the cutting edges. The cutting edges 12, 13 and 14 are defined by the intersections of the relieved plane surfaces 16, 18 and 20 respectively, with a flat side 22 of the blade.

For mounting the blade in a holder it is preferably provided at its rear surface with serrations comprising alternated ribs 24 and grooves 26. The ribs and grooves 24 and 26 are parallel and of uniform cross-section. The sides of the ribs and grooves are inclined to intersect substantially at a point in cross-section and in a specific example of such a blade, the included angle at the apices of the ribs and the included angle between the sides of each groove are 90 degrees. The foregoing example is typical, but the exact cross-sectional shape of the serrations may be varied as desired.

In accordance with the present invention, blades of this type may be formed in their entirety of a hard cutting material such for example as cast alloy, tungsten carbide, or the like. Alternatively, the blades may be formed in their entirety of high speed steel. Certain aspects of the present invention are applicable to blades having body portions of metal and brazed inserts of cutting material such for example as tungsten carbide.

One of the important advantages of the present invention is the production of cutting edges characterized by their ability to retain sharpness in use throughout long services by the substantial elimination of fractures, which develop from small cracks or fissures in the cutting edge left by conventional grinding methods. By machining surfaces 16, 18, 20 and 22 by electric discharge machining, cutting edges and flat surfaces are produced which are microscopically continuous, i. e., they are free from cracks, fissures and the like which result from grinding.

As is well understood, electric discharge machining is characterized by a consumption of the tool or electrode which may be equal to or which may exceed the removal of metal from the work piece. Accordingly, in developing methods and designing machines for the efficient use of electric discharge machining in the removal of metal, this relatively rapid consumption of the tool or electrode must be taken into account.

Referring now to Figures 4–6 there is illustrated a machine designed to produce flat plane surfaces on a work piece by electric discharge machining. The machine comprises a base 30 having thereon a rotary table 32 preferably provided with a magnetic holding surface at its top for retaining in place one or more work pieces 34. By this means the work pieces are held in place without establishing any substantial stresses, which is possible in the present case since the tool or electrode does not come into mechanical contact with the work piece. A motor 36 is operatively connected to the table 32 for rotating the table about its vertical axis. Means are provided for rotating the table at a rate dependent upon removal of metal from the work piece. For this purpose a control box 38 is provided, this being a part of the equipment designed for use with the electrical discharge machining equipment. An electrical connection between the control box 38 and the electric motor 36 is illustrated at 40.

The machine includes a column 42 at the front of which is mounted a vertical slide 44 carrying the machining tool or electrode 46. The electrode is insulated from the machine and a high frequency electrical potential is applied thereto from the control box 38 through an electric connector 48, a brush 50 being provided to complete the circuit to the electrode during rotation of the electrode.

Means are provided for rotating the electrode at a suitable speed and comprises a motor 52.

Means are provided for effecting vertical movement of the slide 44 and this means comprises a motor 54 operating a feed screw 56 cooperating with a nut 57 carried by the slide 44. The motor 54 is connected to the control box 38 by electrical connections 59. Associated with the electrode 46 is a senser device 58 which is vertically adjustable by suitable means such for example as a micrometer 60. Electrical connections 62 extend from the senser 58 to the control box 38. The arrangement is such that as the lower edge portion of the electrode 46 is consumed during an operation, the senser element 58 determines such consumption and through the controller 38 actuates the motor 50 to feed the slide 44 downwardly to maintain the flat lower edge of the electrode 46 which is adjacent the work piece in the same horizontal plane, and at the same elevation.

Referring now to Figure 5, it will be observed that the table 32 is located eccentrically with respect to the electrode 46. It will further be apparent that the electrode 46 is generally cylindrical and has a relatively large radius. The center of the table and electrode are so related that during the machining operation an individual work piece traverses across the lower edge of the electrode from a position in which the work piece lies wholly outside the projection of the outer surface of the electrode through a position in which the work piece occupies a position wholly within the projection of the inner surface of the electrode to a position in which the work piece again lies wholly outside the projection of the outer surface of the electrode.

The control box includes means responsive to an electrical condition dependent upon spacing between the lower flat edge surface of the electrode and the adjacent surface of the work piece and controls the rate of rotation of the table to maintain the average or effective spacing substantially constant. Thus, the rate of rotation of the table 32 is dependent upon the rate of removal of material from the upper surfaces of the work pieces. Due to the rotation of the electrode 46, the lower edge surface thereof is maintained in substantially flat planar condition during the machining operation. In operation the table 32 will rotate at a relatively slow speed. The rotation of the electrode 46 may be on the order of a few revolutions per minute, this rotation being for the purpose of continually presenting a new portion of the surface of the electrode in the work zone so that as the electrode is gradually consumed its lower surface is maintained in a flat planar condition.

Conveniently, the electrode 46 may be a cylindrical brass member. As illustrated in Figure 6, it is within the scope of the present invention to modify the electrode 46 by the addition of an annular body 64 of a hard electrically conducting material such for example as tungsten carbide.

The above described apparatus is for the primary purpose of producing a plane flat surface, but the electric discharge machining method also affords the possibility of producing a serrated surface of various forms and pitch in conductive hard or soft material. In general terms, such a machine consists of a circular wheel of brass or other suitable conductive material of sufficient diameter and revolving at a suitable speed with the general form of the desired serrations machined into its outer surface. To compensate for any reduction in the wheel by consumption of the material thereof during the operation, the machine includes a forming tool designed to form the outer surface of the conducting wheel or electrode to the desired form. This tool is adjustably located so as to maintain the finished dimension of the work piece after redressing the conductive wheel or electrode for the purpose of making correction for electrode or wheel reduction or consumption.

The forming tool is ground or machined to a form which provides compensation on the conducting wheel or electrode as necessary to allow for electrode consumption. In other words, the wheel or electrode has its periphery formed to a definite cross-sectional shape which will produce a different but predetermined and selected cross-sectional shape in the serrations as formed thereby on a work piece.

Referring now to Figures 7–9 there is illustrated apparatus for forming serrations on the back of a work piece. This apparatus comprises a base 70 having a column 72 thereon at the front surface of which is a vertical adjustable slide 74. Manual means comprising a feed screw 76 and a feed nut 78 carried by the slide 74 are provided for effecting vertical adjustment of the slide 74. Mounted on the slide 74 is a rotatable tool or electrode 80, the outer surface of which is of generally cylindrical configuration and is serrated as indicated at 82. Means are provided for effecting rotation of the electrode 80 at moderate speed as for example a few revolutions per minute.

Mounted on the base 70 is a work carriage 84 adapted to support a work piece 86 thereon. Preferably, the work piece 86 is retained in position by suitable magnetic holding means provided on the top of the carriage 84.

A motor 88 is provided for effecting traverse of the carriage 84 and this motor is under control of a control box 90 connected to the motor 88 by electrical conductors 92. Included in the electric discharge machining equipment are means responsive to an electrical condition representing the average spacing between the surface of the electrode and the adjacent surface of the work piece so that the carriage 84 is traversed at a rate dependent upon the rate of consumption or removal of material from the work piece.

Associated with the carriage 84 is a trimmer 94 which is adapted to trim the periphery of the electrode to the required contour.

Referring now to Figure 9, a portion of an electrode 80 is illustrated on an enlarged scale. The serrations thereof comprise alternated ribs 96 and grooves 98 having side walls 100. In the machining operation the periphery of the electrode 80 is trimmed to have the configuration illustrated in full lines in Figure 9. With the parts in the position illustrated in Figure 7, the machining operation is initiated by traversing the carriage 84 to the right. At this time the slide 74 will be adjusted to a predetermined position which will result in machining serrations in the upper surface of the work piece 86 to a required depth. Traverse of the carriage is under control of the control box 90. During the interval between initiation of removal of metal from the work piece and the time when the leading edge of the work piece is advanced to a point directly beneath the center of the electrode, material will be consumed from the serrations on the electrode and it is found that this consumption of material may be compensated for exactly by initially forming the ribs 96 with an included angle at their apices somewhat more acute than the required angle at the bottoms of the corresponding grooves to be formed in the work piece. Thus, during relative movement between the electrode and work piece to a full depth position, the shape of the ribs 96 on the electrode are changed from the shape illustrated in full lines in Figure 9 to the required shape illustrated in dotted lines in this figure. During the balance of the machining operation the shape of the ribs 96 is not modified, although consumption of material from the surfaces thereof continues at a uniform rate.

Dependent upon the length of serrations to be machined in the surface of the work piece and the circumference of the electrode, vertical adjustment of the slide 74 during the machining and a single work piece may or may not be necessary. In any case, when the machining operation is completed, the peripheral surface of the electrode will be again trimmed to the contour illustrated in full lines in Figure 9 prior to the initiation of machining a second work piece.

Preferably, the machining operation is carried out with the working surface of the electrode submerged in a suitable coolant and for this purpose the work support of the machines illustrated in Figures 4 and 7 may include a wall 102 forming with the work support a coolant containing tank.

In the past, efforts to produce cutting blades having serrated backs and adapted to be clamped in a correspondingly serrated holder have encountered difficulties in that it was difficult to obtain substantially accurate parallelism between the serrated back surface and the blade and the plane or flat front surface thereof opposite to the serrated surface. Attempts have been made to produce blades formed in their entirety of a single piece of hard cutting material such as for example tungsten carbide by a grinding operation. It has been necessary to clamp the blade strongly against movement during a grinding operation with the result that when the clamping stress was removed the blade assumed a different configuration. Inasmuch as the present method of machining does not involve any actual contact between the blade and tool, it is unnecessary to set up stresses in clamping or holding the blade for the machining operation. Accordingly, a blade may be produced having substantially accurate parallel surfaces, one of which is serrated and the other of which is flat. This operation may be carried out by supporting the blade on a magnetic table and forming either the serrations or the flat surface thereof by electric discharge machining. Since this operation is carried out without stressing the blade, the machined surface will have an accuracy dependent upon the accuracy of the tool, which accuracy may of course be within negligible limits. Thereafter, the blade is inverted to rest upon the flat supporting surface of the work support with its previously machined surface in contact therewith and the other surface thereof machined by arc machining. By this method, even if the blade is initially distorted or out of a true shape, it will be obvious that the two sequential machining operations will result in a blade characterized by substantially exact flatness and parallelism or controlled angularity between the two opposite surfaces thereof. This is of particular importance since the hard cutting materials of the tungsten carbide type are brittle and have a tendency to break if the clamping in the holder results in bending of the blade.

While the present invention has been disclosed in connection with tungsten carbide material, certain advantages thereof are valuable in any cutting material. By way of example it may be mentioned that the present invention permits the economical production of cutting blades formed in whole or in part of high speed steel in an operation which permits hardening of the blade followed by the formation of serrations therein.

It will of course be appreciated that the present invention may be combined with other operations. Thus for example, a tungsten carbide blade may initially be cast with rough serrations therein and the operations disclosed herein carried out as a final finishing operation.

The drawings and the foregoing specification constitute a description of the cutting elements and the method and apparatus for producing the same in such full, clear, concise and exact terms as to enable any person skilled in the art to practice the invention, the scope of which is indicated by the appended claims.

What I claim as my invention is:

1. The method of machining a flat surface by electrical discharge which comprises providing a tubular electrode having a plane end surface perpendicular to its axis, rotating said electrode, and relatively traversing a work piece across the end of said electrode in a path such that the work piece moves from a position outside the protected outer surface of the electrode through a position entirely within the projected inner surface of the electrode to a position entirely outside the projected outer surface of the electrode, and maintaining a high frequency electrical discharge between the electrode and work piece during traverse of the end surface of the electrode by the work piece.

2. The method as defined in claim 1 which comprises advancing the work piece in a curved path.

3. The method as defined in claim 1 which comprises advancing the work piece in a circular path intersecting the projection of the end surface of the electrode at two spaced points.

4. The method as defined in claim 1 which comprises advancing the work piece in a circular path of larger radius than the end surface of the electrode intersecting the projection of the end surface of the electrode at two spaced points less than 180° apart thereon.

5. Apparatus for finishing flat surfaces by electric discharge which comprises a rotary table, means for rotating said table, means for supporting a work piece adjacent the edge of said table, means for supporting a tubular electrode having a plane end surface with its end surface parallel to said table, said electrode being disposed with its axis spaced from the axis of rotation of said table and having a radius such that the side of said electrode remote from the axis of said table is located laterally beyond that path of transit of a work piece on said table, means for rotating said electrode about its axis, and means for maintaining a high frequency electric discharge between said electrode and work piece during transit of said work piece across the flat end surface of said electrode.

6. Apparatus as defined in claim 5, which comprises means effective to feed said electrode vertically to maintain a substantially constant spacing between adjacent surfaces of said electrode and table.

7. Apparatus for machining a flat surface by electric discharge which comprises a tubular electrode having a flat end surface perpendicular to its axis, means for rotating said electrode, a support for a work piece, means for relatively moving said electrode and support in a direction to cause a work piece on said support to move across the plane end of the electrode in a plane perpendicular to the axis thereof.

8. Apparatus for machining a flat surface by electric discharge which comprises a tubular electrode having a flat end surface perpendicular to its axis, means for rotating said electrode, a support for a work piece, means for relatively moving said electrode and support in a direction to cause a work piece on said support to move across the plane end of the electrode in a plane perpendicular to the axis thereof and in a path at one side of the axis of said electrode.

9. Apparatus as defined in claim 8, in which said work support is mounted for rotation about an axis parallel to but spaced from the axis of said electrode.

10. The method of machining a flat surface of a work piece by electrical discharge which comprises rotating a tubular cylindrical electrode having a substantially right planar end surface about its axis, relatively traversing a work piece having a dimension such as to be entirely located within an imaginary projection of the internal circumference of said electrode across the plane end of said electrode in a path which results in transfer of said work piece between a position wholly within the imaginary projection of the internal circumference and a position wholly outside the imaginary projection of the external circumference of said electrode to machine the surface of the work piece adjacent the end of the electrode into a flat surface parallel to the plane of the end of the electrode, maintaining a high frequency electrical discharge between the electrode and work piece, feeding the electrode axially to maintain its end surface substantially in a fixed plane relative to the path of movement of the work piece, and controlling the rate of relative traverse between said work piece and electrode in accordance with the rate of removal of material from the work piece.

11. Apparatus for machining the flat surface of a series of work pieces by electrical discharge which comprises a rotating support for receiving a series of work pieces at positions displaced substantially equally from the axis thereof, a rotary tubular electrode having a substantially planar end surface perpendicular to its axis and spaced from and parallel to the plane of rotation of said support, the internal circumference of said electrode being of a size such to receive individual work pieces therein, means for establishing high frequency electrical discharge between said electrode and work pieces on said support, said electrode being located laterally from the axis of rotation of said support in a position such that work pieces on said support pass in an arcuate path from a position wholly outside the imaginary projected outside circumference of the electrode to a position wholly within the imaginary projected inside circumference of the electrode, and thence to a position wholly outside the imaginary projected outer circumference of the electrode, means responsive to consumption of the electrode by the machining operation to maintain the end surface of the electrode substantially in a fixed plane relative to the plane of rotation of the work pieces, and means responsive to the rate of consumption of material from the surface of the work piece to control the rate of rotation of said support.

12. The methd of machining flat surfaces by electrical discharge which comprises providing a tubular electrode having a plane end surface perpendicular to its axis and an internal diameter greater than the transverse dimensions of work pieces to be finished by the electrode, rotating the electrode at a slow speed of not more than a few revolutions per minute, traversing a series of work pieces across the end of said electrode in a path such that the work pieces move from a position outside the projected end surface of the electrode through a position within the projected end surface of the electrode to a position outside the projected end surface of the electrode, maintaining a high frequency electrical discharge between the electrode and work pieces during traverse of the work pieces across the end of the electrode, and controlling the rate of traverse of the work pieces in accordance with the rate of removal of material therefrom.

13. The method as defined in claim 12 which comprises moving the electrode axially toward the work pieces at a rate determined by the consumption of material of the electrode.

References Cited in the file of this patent

UNITED STATES PATENTS

| | | |
|---|---|---|
| 520,300 | Coffin | May 22, 1894 |
| 2,015,415 | Steiner | Sept. 24, 1935 |
| 2,059,236 | Halslag | Nov. 3, 1936 |
| 2,197,430 | Graves et al. | Apr. 16, 1940 |
| 2,308,860 | Clark | Jan. 19, 1943 |
| 2,355,838 | Young et al. | Aug. 15, 1944 |
| 2,370,273 | Ulliman | Feb. 27, 1945 |
| 2,385,665 | Warwick | Sept. 25, 1945 |
| 2,424,473 | Luers | July 22, 1947 |
| 2,479,412 | Rutter | Aug. 16, 1949 |
| 2,526,423 | Rudorff | Oct. 17, 1950 |

FOREIGN PATENTS

| | | |
|---|---|---|
| 637,793 | Great Britain | May 24, 1950 |